Aug. 6, 1935.          D. H. LOUGHRIDGE          2,010,601
                        ELECTRIC FISH STOP
                       Filed Oct. 7, 1930
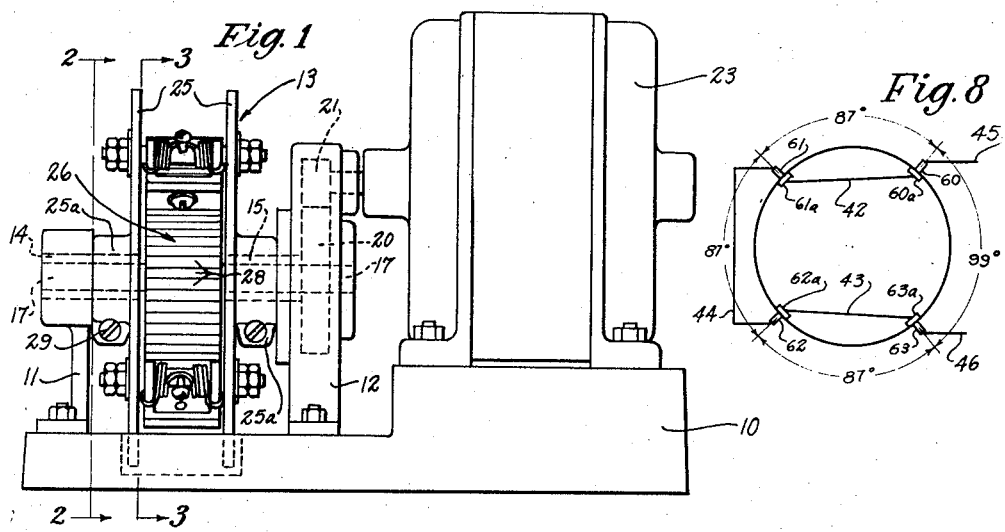
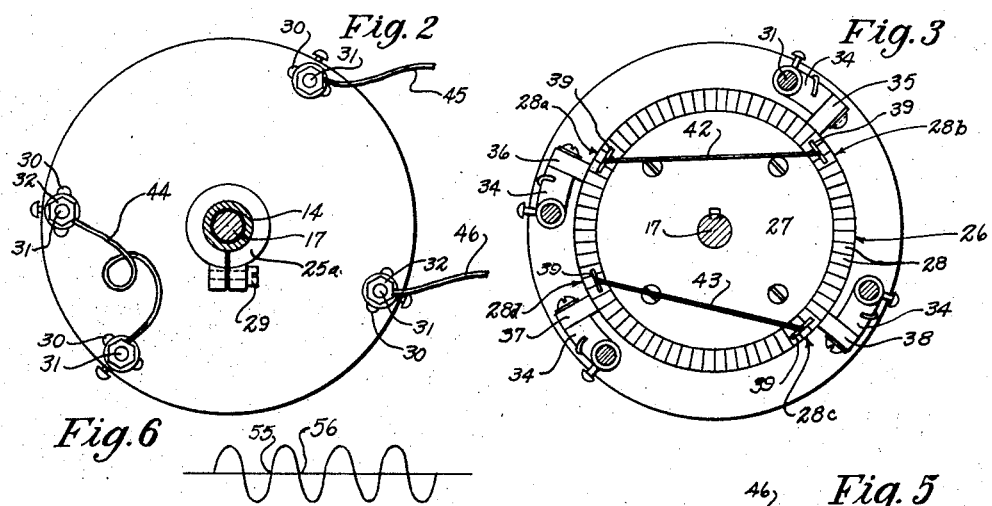
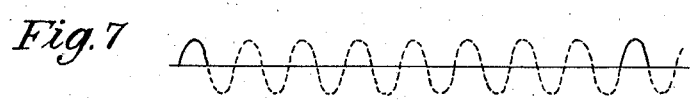
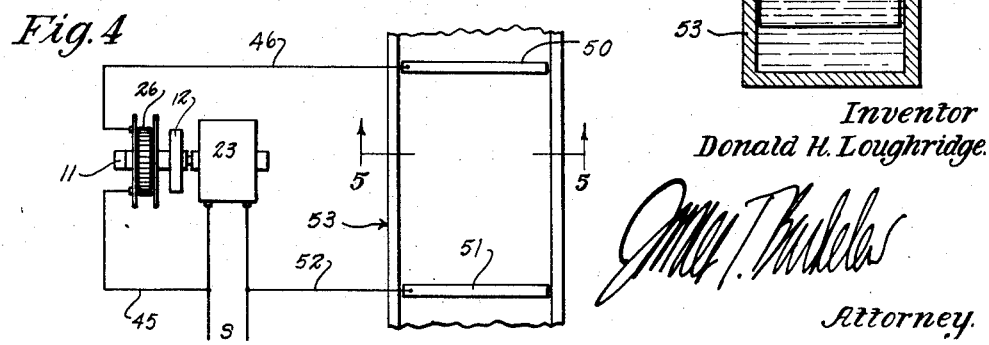
Inventor
Donald H. Loughridge.
Attorney.

Patented Aug. 6, 1935

2,010,601

UNITED STATES PATENT OFFICE 2,010,601

ELECTRIC FISH STOP

Donald H. Loughridge, Pasadena, Calif., assignor to Robert C. Burt, Pasadena, Calif.

Application October 7, 1930, Serial No. 486,965

9 Claims. (Cl. 175—311)

This invention relates to improvements in electric fish stops and more particularly to improvements in the means of supplying electric current to such stops.

Devices of this nature involve the use of a set of electrodes in a fish run, between which is passed sufficient electrical current to prevent the passage of fish. In order to provide an effective barrier for fish of all sizes, however, it has often been found necessary to employ such a large current that some of the fish are killed.

It is therefore a primary object of the present invention to provide an interrupted current of such characteristics that fish of all sizes will effectively be stopped, but which will have no injurious effects whatever upon any of the fish.

It is a further object of the invention to provide a current interrupter particularly adapted to the purpose, which is of simple and inexpensive construction, and durable and free from trouble through long periods of use.

According to my invention, I provide means for causing intermittent current impulses to flow between the electrodes, whereby a relatively higher potential gradient than has heretofore been possible can be applied across the fish run without danger to the fish. And the repeated shocks at the higher gradient thus possible are found to be a most effective barrier to the fish.

For this purpose, I provide a motor driven rotary interrupter which is placed in series with the electrodes in the stream and which is adapted intermittently to complete the electric circuit, thus allowing the current to pass between the electrodes in intermittent impulses. The time periods between current flow impulses are ordinarily substantially longer than the periods of current flow, the use of every sixteenth half cycle of fifty cycle current having been found successful. The increased effectiveness of current impulses of this character eliminates the necessity of a series of electrodes having progressively higher potentials impressed between them, as has heretofore been common, and permits a more compact arrangement of the electrodes. The total power consumption is also reduced as a result of intermittent use of the current, since the total time of current flow may be small in comparison with the total time between impulses.

My improved means of adapting electric current to a fish stop permits the use of either direct or alternating current for this purpose without additional appliances in either case, and also permits the use of current supply with or without transformers. Alternating current is preferably used and I will describe my invention in this connection since its features will perhaps thus best be illustrated, but it will be understood that I do not intend to limit myself thereto as it is obvious that direct current may also be used.

The above and other objects and features of my invention will be more readily understood from the following description, and reference to the drawing, in which:

Fig. 1 is a side elevation of the interrupter and the driving motor;

Fig. 2 is a section taken along the line 2—2 of Fig. 1 showing the interrupter in end elevation;

Fig. 3 is a section taken along the line 3—3 of Fig. 1 showing the interrupter rotor in end elevation;

Fig. 4 is a plan view of a simplified form of fish run showing, more or less conventionally, a set of electrodes which may be used, together with a wiring diagram of the entire device;

Fig. 5 is a section taken on line 5—5 of Fig. 4;

Fig. 6 is a diagrammatic representation of a sine wave alternating current;

Fig. 7 is a diagram illustrating the characteristic nature of the current impulses provided in accordance with the present invention; and Fig. 8 is a diagram showing a variational spacing of the commutator brushes and connected segment sets.

Fig. 1 shows a base 10 upon which are mounted the bearing bracket 11 and the gear case 12 which support the interrupter assembly, generally indicated by the numeral 13. Secured in the bearing bracket 11 is a fixed sleeve 14 while secured in the gear case 12 is a similar sleeve 15, said sleeves serving as bearings within which the shaft 17 is rotatably mounted. On the end of shaft 17 within gear case 12 is secured a gear 20, and meshing therewith is a pinion 21, said pinion 21 being on the drive shaft of a synchronous motor 23, which is also supported by base 10.

Keyed to the rotatable shaft 17 to turn therewith and located between bearing bracket 11 and gear case 12, is the interrupter rotor 26. This rotor is preferably, though not necessarily, made up from a usual commutator of well known form, which includes a core 27 and insulated copper segments 28. This form of rotor is convenient to provide, as it is only necessary to choose an ordinary commutator of proper dimensions and make the necessary electrical connections, as hereinafter described. This form of rotor is, however, but one simple form which may be used, and constitutes no limitation on the broader aspects of the invention.

At the sides of the rotor and carried one on each of the sleeves 14, 15, are circular end plates 25 which serve to support brush holders in proper adjustable relation to the rotor, as will be explained. As shown best in Fig. 2, each of the plates 25 is provided with an integrally formed split hub 25a so that by means of a clamping screw 29 it may be secured to the fixed sleeve in any position desired. Near the periphery of each end plate 25 is a plurality of circularly spaced, arcuate slots 30, here shown as four in number, through which pass bolts 31, which are locked in place on plates 25 by adjusting nuts 32; and mounted upon bolts 31 between plates 25 are brush holders 34 of any suitable form, carrying brushes 35, 36, 37 and 38, respectively, which may be of any suitable material such as carbon. Thus by rotatably adjusting the position of the plates 25 on the supporting sleeves, the relation of all of the brushes as a whole may be rotatably adjusted with relation to the interrupter rotor, while by adjusting the positions of the bolts 31 in slots 30 the brushes may individually be rotatably adjusted with relation to the rotor.

As shown in Fig. 3, there are selected on the interrupter rotor four spaced sets of segments 28a, 28b, 28c and 28d of three adjacent segments each, more or less, within which the segments are electrically connected together by wires 39; and these sets are divided into two pairs of adjacent sets 28a and 28b, and 28c and 28d electrically connected together by means of wires 42 and 43, respectively. The remainder of the segments are of course insulated from each other, and it will be seen that, in effect, there is provided a rotor having four spaced electrical contacts separated by insulated surfaces. A lead wire 45 from any suitable electrical supply source, though preferably the same source S from which the motor 23 derives its power, and a wire 46 leading to one of the electrodes of the fish stop, hereinafter to be described, are shown connected to the brushes 35 and 38 of the interrupter, the other brushes 36 and 37 being electrically connected together by means of a wire 44. The rotor being in the instantaneous position shown, current will then pass through the interrupter by the following path; lead wire 45, brush 35 and contacting segments 28b, wire 42, brush 36 and contacting segments 28a, wire 44, brush 37 and contacting segments 28d, wire 43, brush 38 and contacting segments 28c, and out by lead wire 46. The four brushes are thus connected in series so that the current flows through each one in turn. This connection is desirable, though not necessary, in order that the potential gradient through the interrupter may be made less steep than would be the case if there were only two brushes used, or in other words, so that the voltage drop across each of the brushes may be reduced to a suitably low value. It will be obvious that a greater or a lesser number of brushes than four may be used as desired.

The arrangement of the segments and brushes is such that current flows through the interrupter only once during each revolution namely, at the position shown in Figure 3 and described in the preceeding paragraph. To achieve this end, the sets of segments 28a, 28b, 28c and 28d are arranged at unequal spacings around the rotor, and the corresponding brushes 36, 35, 38 and 37 are similarly spaced. For example, the included angle between the segment sets 28b and 28a and between the segment sets 28a and 28d may be equal to 70 and 40 degrees, respectively, while the included angle between the segment sets 28a and 28b and between segment sets 28c and 28d may each be 95 degrees. Various other spacings will of course be possible, the above being given simply as being typical, but without limitative effect on the invention. For instance, Fig. 8 indicates another arrangement, wherein the spacings between brushes 60 and 61, 61 and 62, and 62 and 63 are each equal to say 87 degrees, while the spacing between brushes 63 and 60 is equal to 99 degrees. Here again, the circuit is made through the interrupter only once for each revolution thereof. The angles of course may be varied to suit circumstances, but it will be seen that according to the last arrangement there are provided three equal brush spacings and one brush spacing differing therefrom.

Between the successive positions of the rotor 21 relative to the brushes as shown in Fig. 3, where the simultaneous contact of the brushes and the sets of segments is shown as just being broken, assuming a clockwise direction of rotation, there will not be more than one set of segments in contact with any brush at any single instant. If the brushes were located at equal distances around the periphery or about any axis of symmetry, there would be more than one current making contact per revolution, either by a short circuit between the lead wires 45 and 46 or in the normal path indicated above.

To avoid serious sparking at the brushes, it is necessary that the current flowing through the interrupter at the time that the contact between brushes and live segments is broken should be passing through zero, or as nearly so as possible. To accomplish this, the period during which the electric circuit through the interrupter is complete is made to coincide exactly with a whole half cycle of the alternating current. Thus if it is desired to utilize only the first half of a cycle, that is, for instance, the part between the zero points 55 and 56 on the sine wave curve of Fig. 6 the initial contact between the brushes and segments should be made at the instant the current starts on the cycle at zero point 55, and the contact should finally be broken at the time the current passes through zero point 56 at mid-cycle. The duration of contact is thus seen to be exactly one-half of a full cycle. It will, of course, be understood that any multiple of a half cycle may also be used since the current is zero at the beginning and mid-point of each cycle. I prefer however, to use only a half cycle since the shorter duration permits the use of a higher potential than would be the case if a whole cycle or more than a whole cycle were used, as will become apparent.

Each revolution of the rotor thus permits a half cycle of current to flow therethrough, and the speed of rotation will determine the frequency of such impulses. Using a 50 cycle current as an example, a speed of six and one quarter revolutions per second will pick off each sixteenth half-cycle. The ratio between gears 20 and 21 must then be made such as to give this speed to the rotor for whatever speed the synchronous motor 23 has. The length of the impulse, that is whether a half cycle or more is picked off the line, depends on the length or number of the segments connected together on the rotor. Thus in the above example, a length of one sixteenth of the circumference would be correct. Fig. 6 shows the nature of the current impulses passed through the interrupter, the dotted sine wave curve representing the current supplied, and the full line parts representing the current impulses passed by the rotor. It will be noted that every sixteenth half cycle, in the present case, is passed through the interrupter.

The reason for the split hub 25a on plate 25 is now apparent, for the arrangement permits the shifting of all the brushes as a unit so that the points of initial and final contact coincide exactly with the points 55 and 56 on the current curve where the current flow is passing through zero. The slots 30 permit adjustment of the individual brushes so that they can be individually rotated both with relation to each other and to the segments on the rotor.

The use of a synchronous motor to drive the interrupter assures that the speed of the interrupter will be maintained in a constant relation to the power line frequency. When the motor and interrupter are connected in parallel across the line, any change in frequency of the current is reflected in a change in speed of the rotor so that once the brushes are correctly set, no adjustments are required to accommodate the device to currents of varying frequency.

In Fig. 4 is conventionally shown a fish run 53 made in any convenient shape from any suitable material. Located in the channel of the fish run are electrodes 50 and 51 between which all of the water must pass, the electrodes being energized by the current pulsations passed through the interrupter. The electrodes 50 and 51 may be of any convenient form, being here simply shown conventionally since suitable electrodes are well known in the art. The current is furnished to the electrodes 50 from the interrupter by lead wire 46, and then passes through the water to the electrode 51 whence a lead wire 52 conducts it back to the electric supply line. With the use of my device, the current supply to the interrupter may be at 160 volts, the potential gradient in the fish run being fixed at a value suitable to stop the fish in any given case. The voltage impressed across the interrupter may, however, vary within wide limits, as will be well understood.

The current impulses, produced at a rate of approximately six per second, cause the fish to stop immediately upon coming within their influence, and to turn and swim back in the opposite direction. By producing the current in these intermittent impulses, it may be at comparatively high voltage, which will cause the fish instantly to turn, without the current being of sufficient duration to cause injury to the fish.

It will be understood that direct current may be used with my improved interrupter, if desired, and the frequency and duration of the electrical impulses may be the same as with alternating current, but it is only with the latter that sparking at the brushes can be conveniently prevented.

While I have now illustrated and described certain specific means for carrying out an embodiment of my invention, it will be obvious that various changes in design, structure and arrangement may be effected without departing from the spirit and scope of my invention; and it is therefore to be understood that all such changes are contemplated within the scope of my invention as expressed in the following claims.

I claim:

1. The method of stopping fish from swimming through a run, that includes subjecting the water in said run intermittently to selected single half cycles of alternating current at a potential gradient sufficient to stop but not to injure the fish.

2. In combination with a fish run having electrodes therein, a source of alternating current connected to said electrodes, a rotary current interrupter for interrupting the current energizing said electrodes, and a synchronous motor energized by said source and driving said interrupter.

3. In combination with a fish run having electrodes therein, a source of alternating current, an electrical circuit energized by said source of alternating current and including said electrodes, a rotary current interrupter in said circuit, a synchronous motor energized by said source of alternating current and driving said rotary current interrupter, said interrupter arranged to select and transmit to the electrodes intermittent half cycles of the current available from said source.

4. In combination with a fish run having electrodes therein, a source of alternating current, an electrical circuit energized by said source of alternating current and including said electrodes, a rotary current interrupter in said circuit, a synchronous motor energized by said source of alternating current and driving said rotary current interrupter, said interrupter arranged to intermittently conduct to the electrodes the current available in said circuit.

5. In combination with a fish run having electrodes therein, a source of alternating current, an electrical circuit energized by said source of alternating current and including said electrodes, a rotary current interrupter in said circuit, a synchronous motor energized by said source of alternating current and driving said rotary current interrupter, said interrupter arranged to close and open the electrical circuit to the electrodes at selected zero points of the alternating current wave.

6. In combination with a fish run having electrodes therein, a source of alternating current, an electrical circuit energized by said source of alternating current and including said electrodes, and a current interrupter arranged to select and transmit to the electrodes intermittent half cycles of the current available from said source.

7. In combination with a fish run having electrodes therein, a source of alternating current, an electrical circuit energized by said source of alternating current and including said electrodes, and a current interrupter in said circuit arranged to close the electrical circuit periodically and thereafter to open said circuit at a zero point of the alternating current wave.

8. In combination with a fish run having electrodes therein, a source of alternating current, an electrical circuit energized by said source of alternating current and including said electrodes, and a current interrupter in said circuit arranged to close and open the electrical circuit to the electrodes at selected zero points of the alternating current wave.

9. In combination with a fish run having electrodes therein, a source of electrical current, an electrical circuit adapted to be energized by said source of current and including said electrodes, and a current interrupter in said circuit arranged to close the electrical circuit periodically and thereafter to open said circuit at a time when the current flow therein is substantially zero.

DONALD H. LOUGHRIDGE.